United States Patent [19]

Kuse

[11] Patent Number: 5,346,270
[45] Date of Patent: Sep. 13, 1994

[54] AUTO-CLAMPER FOR PALLETS

[75] Inventor: Hisao Kuse, Ishikawa, Japan

[73] Assignee: Tsudakoma Kogyo Kabushiki Kaisha, Japan

[21] Appl. No.: 56,736

[22] Filed: Apr. 29, 1993

Related U.S. Application Data

[60] Continuation of Ser. No. 978,200, Nov. 18, 1992, abandoned, which is a continuation of Ser. No. 767,053, Sep. 27, 1991, abandoned, which is a division of Ser. No. 421,148, Apr. 13, 1989, Pat. No. 5,052,735.

[30] Foreign Application Priority Data

Oct. 14, 1988 [JP] Japan .................. 63-258921
Dec. 23, 1988 [JP] Japan .................. 63-327299
May 16, 1989 [JP] Japan .................. 1-123966

[51] Int. Cl.$^5$ ............................ B66C 1/26; B66C 1/28
[52] U.S. Cl. .................. 294/81.5; 294/81.51; 294/81.54
[58] Field of Search .................. 294/81.5, 81.51, 81.6, 294/81.61, 82.24, 82.26, 82.31, 82.32, 110.1, 110.2

[56] References Cited

U.S. PATENT DOCUMENTS

| | | | |
|---|---|---|---|
| 2,245,270 | 6/1941 | Goode | 294/82.32 |
| 2,350,999 | 6/1944 | Beirise | 294/82.32 X |
| 2,425,309 | 8/1947 | Ennis | 294/82.32 X |
| 2,789,468 | 4/1957 | Burns | 294/82.26 X |
| 2,869,916 | 1/1959 | Benson | 294/82.26 X |
| 3,148,909 | 9/1964 | Tantlinger | 294/81.5 X |
| 3,191,984 | 6/1965 | Hanula | 294/82.32 |
| 3,600,031 | 8/1971 | Coleman et al. | 294/110.1 X |
| 4,202,576 | 5/1980 | Hasquenoph et al. | 294/82.26 |
| 4,318,561 | 3/1982 | Hasquenoph et al. | 294/82.26 |

Primary Examiner—Dean J. Kramer
Attorney, Agent, or Firm—Lerner, David, Littenberg, Krumholz & Mentlik

[57] ABSTRACT

In construction of a clamper for automatically clamping a pallet carrying a workpiece to a clamp table on, for example, a cutting machine, a clamp spring is attached to a hook piece used for hoisting the pallet in an arrangement such that turning of the hook piece in the unclamping direction at hoisting the pallet should deform the clamp spring to store its strain energy, and that opposite turning of the hook piece should cause release of the strain energy by the clamp spring on restoration from deformation to firmly engage a clamper head to an anchor block on the clamp table. Use of the strain energy for clamping operation well avoids conventional need for pneumatic or hydraulic pressure and interfaces to be otherwise interposed between a pressure source and the clamper.

12 Claims, 18 Drawing Sheets

Fig. 1
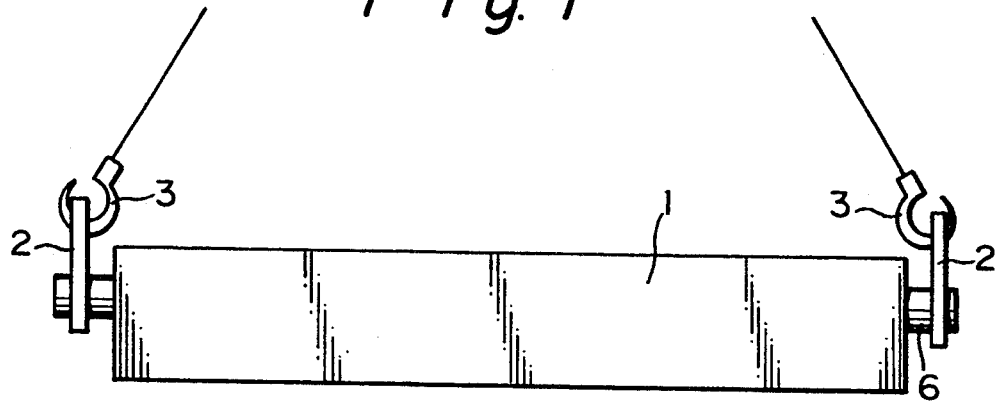
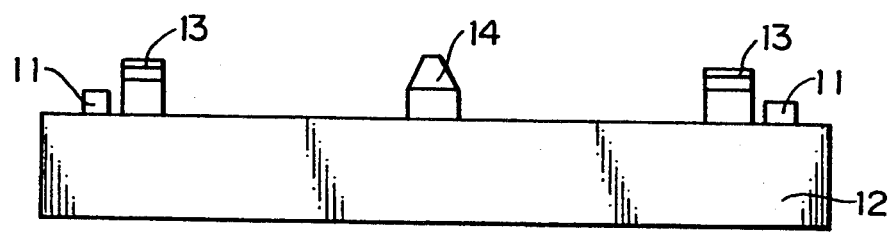
Fig. 2
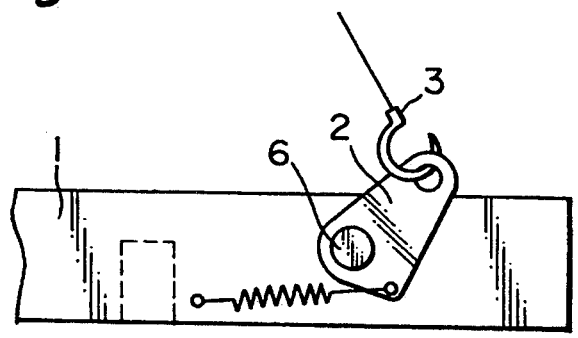
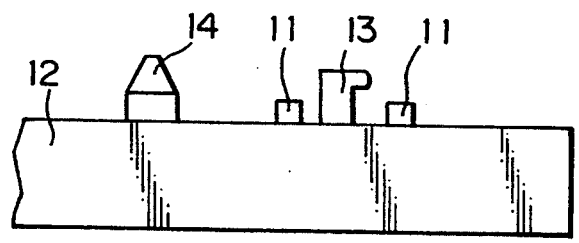

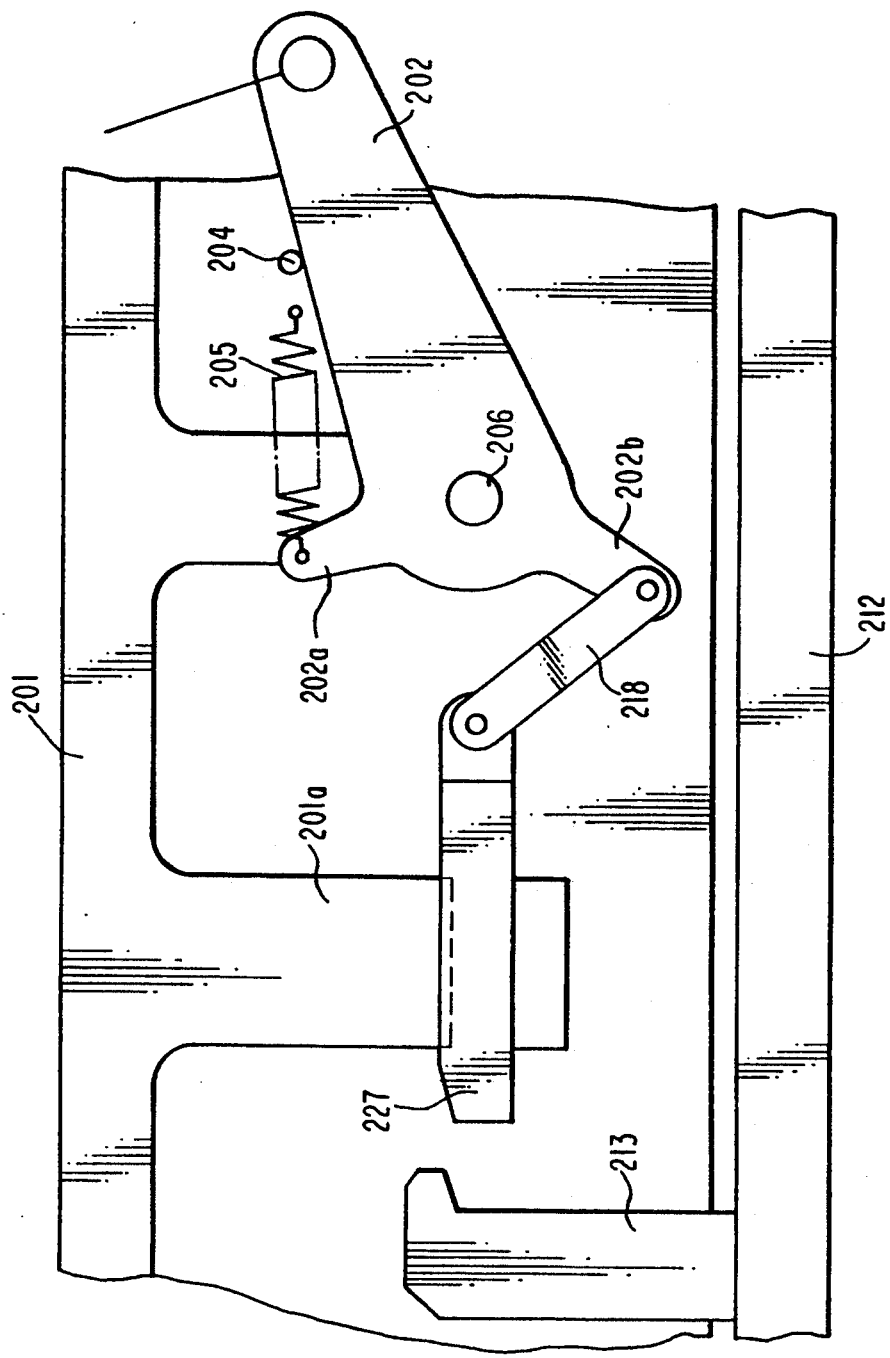

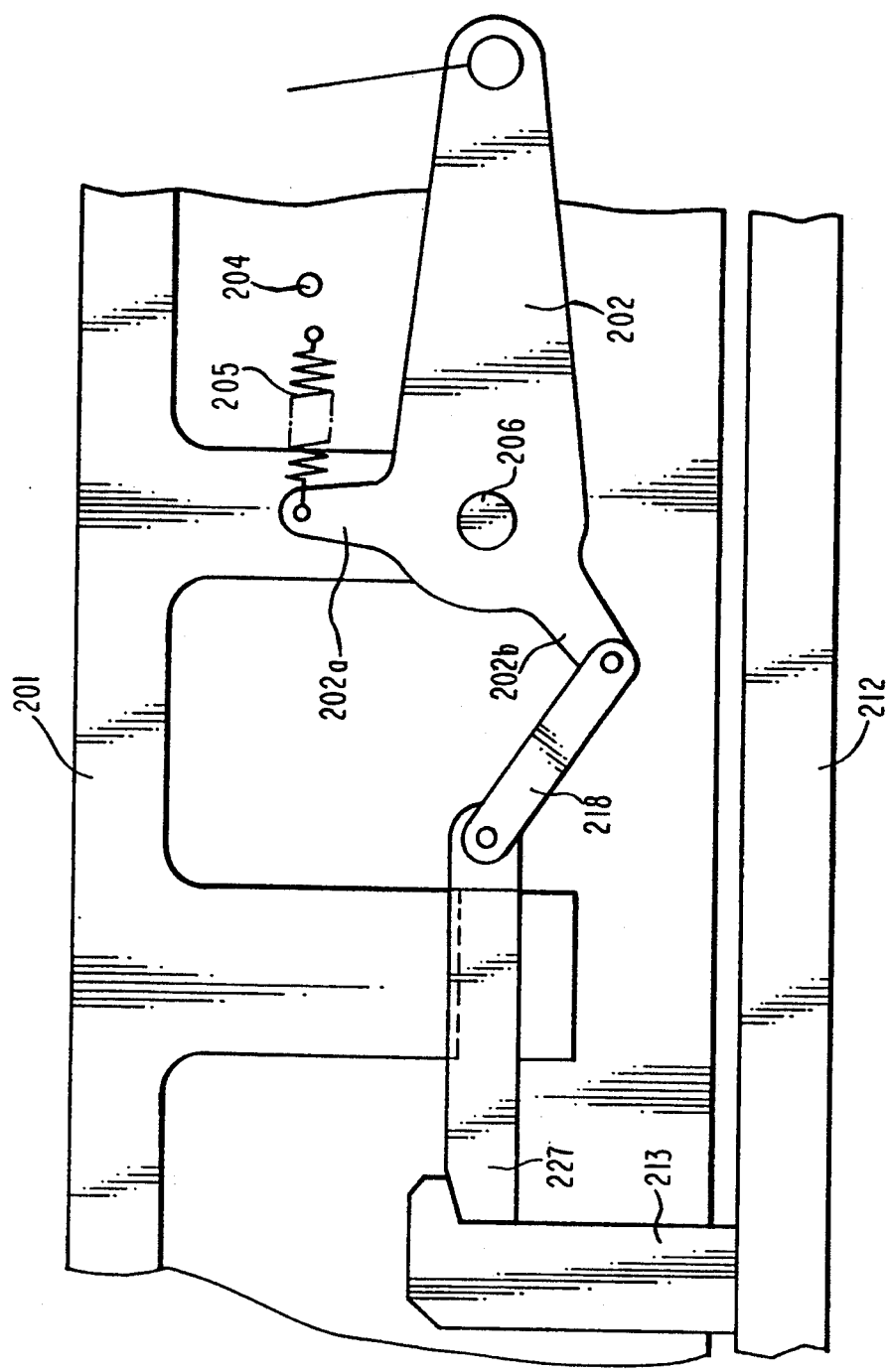

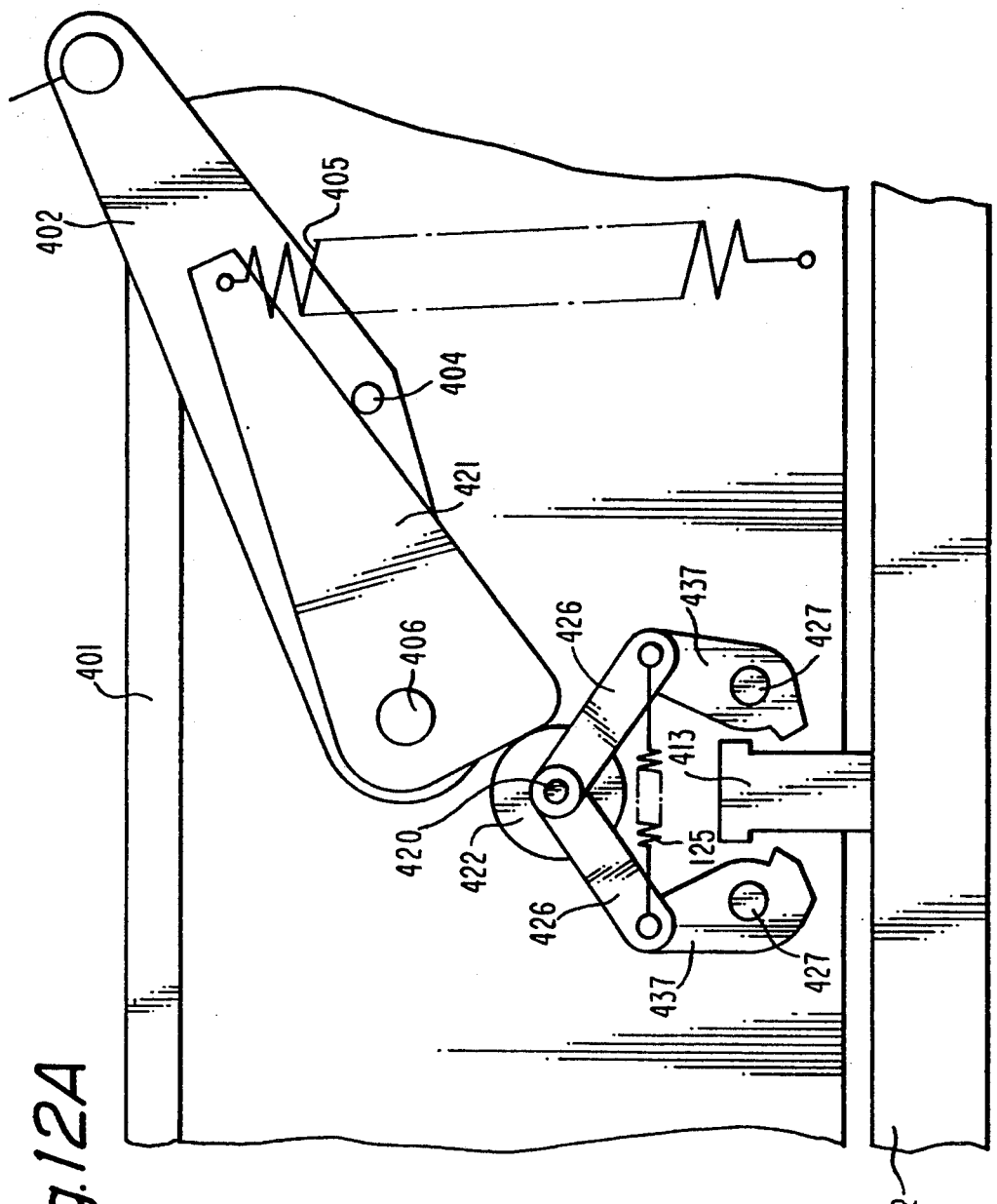

AUTO-CLAMPER FOR PALLETS

This application is a continuation of Ser. No. 07/978,200 filed Nov. 18, 1992, now abandoned, which is a continuation of Ser. No. 07/767,053, filed Sep. 27, 1991 now abandoned, which is a division of Ser. No. 07/421,148, filed Apr. 13, 1989, now U.S. Pat. No. 5,052,735.

BACKGROUND OF THE INVENTION

The present invention relates to an improved auto-clamper for pallets, and more particularly relates to improvement in automatic clamping of a pallet carrying a workpiece to a working table on, for example, a cutting machine.

Manual or automatic operation is conventionally employed in clamping a pallet carrying a workpiece to a working table of a machine, such as a cutting machine. Increased weight of a large workpiece, however, makes it quite infeasible to correctly clamp the pallet by manual operation. In addition, with the recently growing demand for full automation in a production line, it is generally required to remove manual operations from the production line as much as possible. For these reasons, automatic clamping is now broadly employed in the field of machining of workpieces. Automatic clamping is generally carried out utilizing pneumatic or hydraulic pressure, thereby increasing the running cost of an auto-clamper. In addition, one or more interfaces have to be interposed between the pressure source and the clamper and use of such interfaces tends to increase the installation cost of the working machine. Further, the mode of combination of such an interface with a clamper differs from machine to machine. In general, one type of interface cannot span machines of different types. Thus the conventional auto-clampers are quite unsuited for universal applications.

SUMMARY OF THE INVENTION

It is the object of the present invention to provide a universal type auto-clamper which is able to operate without any assistance by pneumatic and hydraulic pressures.

According to the basic aspect of the present invention, at least one hook piece is turnably mounted to a pallet in mechanical connection with a clamp spring fixed to the pallet, turning of the hook piece at hoisting of the pallet causes spring deformation which stores corresponding strain energy in the clamp spring, and the strain energy so stored is released to clamp the pallet to a clamp frame via a clamper head associated with the hook piece.

BRIEF DESCRIPTION OF THE DRAWINGS

FIG. 1 is an end view of the entire arrangement of one embodiment of the auto-clamper in accordance with the present invention, FIG. 2 is a partial side view of the auto-clamper in an unclamped position.

FIGS. 10A and 10B are side views of the other embodiment of the auto-clamper in accordance with the present invention in the unclamped and clamped positions, respectively, FIGS. 12A and 12B are side view of the other embodiment of the auto-clamper in accordance with the present invention in the unclamped and clamped positions, respectively.

DESCRIPTION OF THE PREFERRED EMBODIMENTS

Figure 3:
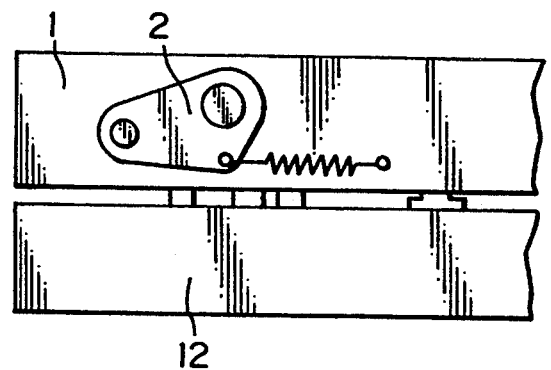
FIG. 3 is a partial side view of the auto-clamper in a clamped position.
Figure 4:
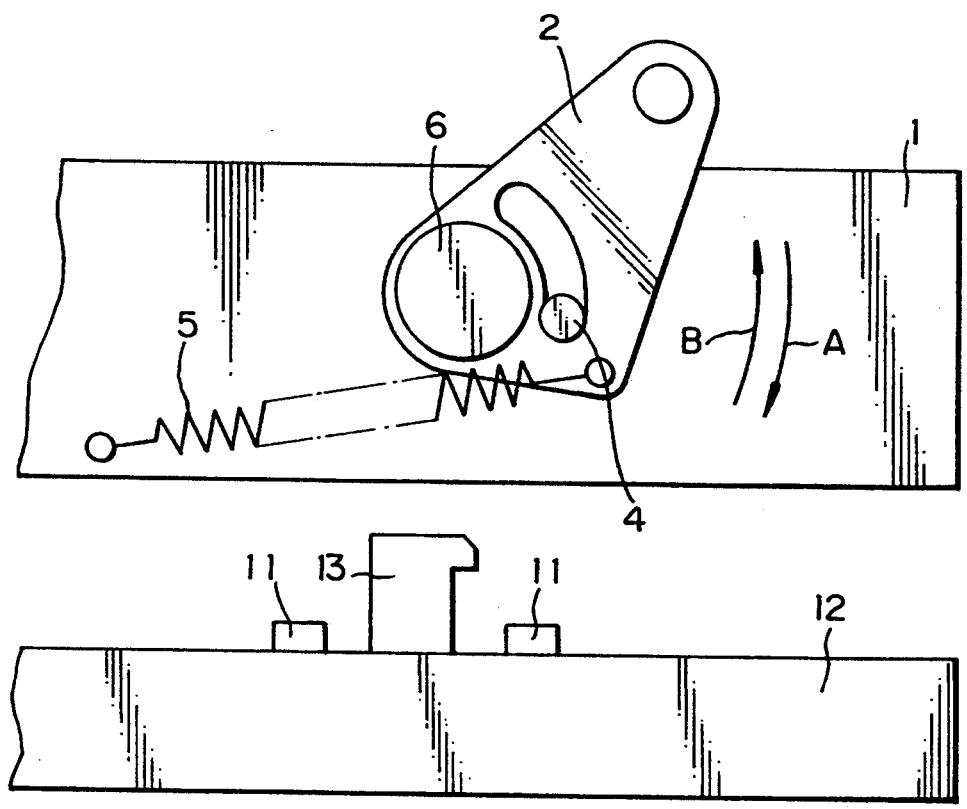
FIGS. 4 to 6 are side, partly sectional end and partly sectional side views of the main part of the auto-clamper in the unclamped position.

One embodiment of the auto-clamper in accordance with the present invention is shown in FIGS. 1 to 8. The unclamped position of the auto-clamper is shown in FIGS. 1 and 2 in which four sets of hook pieces 2 are provided on a pallet 1 and the pallet 1 is hoisted by an overhead hoist mechanism not shown via hooks 3 in engagement with the hook pieces 2. A clamp frame 12 on a machine is provided on its upper face with register blocks 11, anchor blocks 13 for engagement of the pallet 1 with the clamp frame 12 and a positioning pin 14. In this position, each hook piece 2 turns in an unclamping direction B as shown in FIG. 4 to abut a stopper 4 on the pallet 1 and hoist the pallet 1. As the hook piece 2 turns in the unclamping direction B, a clamp spring 5, a tension spring in this example, mechanically connected to the hook piece 2 is stretched so that strain energy should be stored in the clamp spring 5 as later described in more detail.

Figure 5:
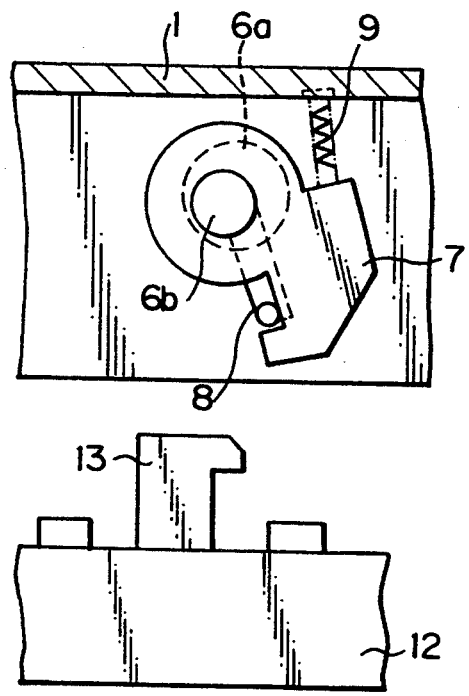
Figure 6:
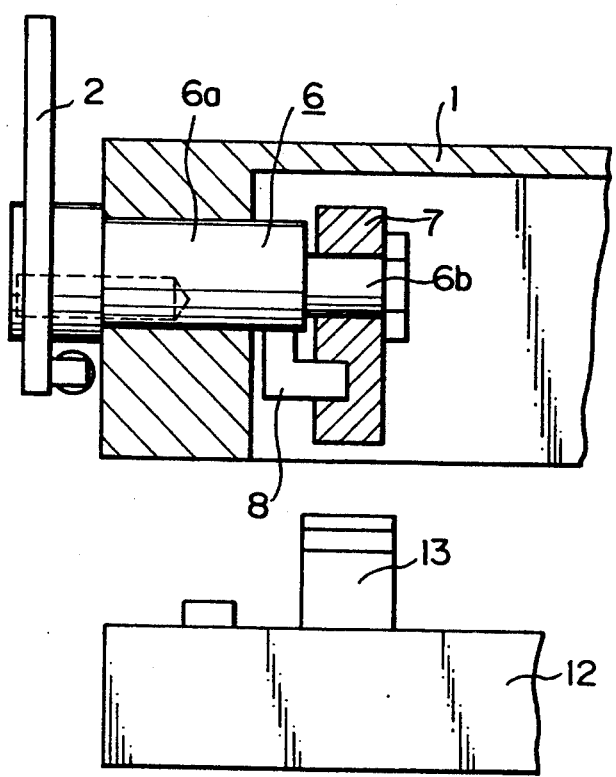
Figure 7:
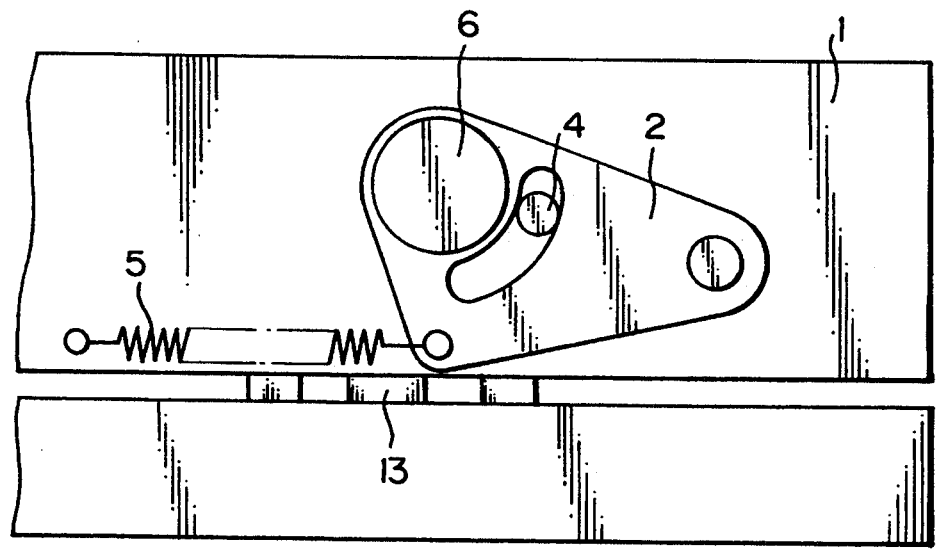
FIGS. 7 and 8 are side and partly sectional end views of the auto-clamper in the clamped position.
Figure 8:
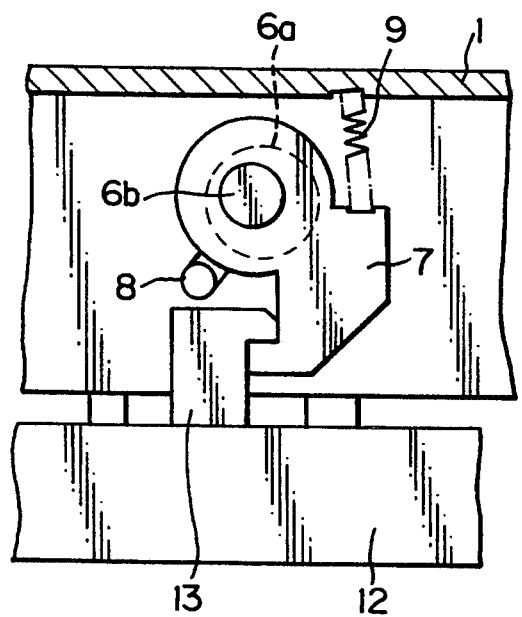

As shown in FIGS. 4 to 6, the hook piece 2 is secured to one end of a horizontal support shaft 6 which is axially rotatably mounted to the side face of the pallet 1. In the case of this embodiment, the clamper head is given in the form of a clamp piece 7 idly inserted over the other end of the support shaft 6. As shown in FIG. 5, the support shaft 6 is made up of a thick section 6a in engagement with the hook piece 2 and a thin section 6b in engagement with the clamp piece 7. The center axis of the thin section 6b is eccentric with respect to the center axis of the thick section 6a. As the hook piece 2 turns to rotate the support shaft 6, the center axis of the thin section 6b rotates around the center axis of the thick section 6a. This eccentric relationship between the two axes is very important in the construction of this embodiment.

A stopper 8 radially projects from the support shaft 6 to limit turning of the clamp piece 7 by its abutment. As shown in FIG. 5, a back-up spring 9 is interposed between the pallet 1 and the clamp piece 7 so that the clamp piece 7 should always be urged to turn in a clamping direction A.

When the pallet 1 is hoisted as shown in FIGS. 4 and 5, the hook piece 2 is turned in the unclamping direction B and the clamp spring 5 connected thereto is stretched to store strain energy therein. By this turning of the hook piece 2 the clamp piece 7 is brought out of engagement with the anchor block 13 on the clamp frame 12 at the end of its movement in the unclamping direction B. Due to the above-described eccentric relationship on the support shaft 6, turning of the hook piece 2 out of the engagement with the anchor block 13 moves the clamp piece 7 upwards.

Lowering of the pallet 1 terminates when it comes into contact with the register block 11 on the clamp frame 12. With a continued downward movement of the hook piece 2, the hook piece 2 starts to turn in the clamping direction A due to the operation of the clamp spring 5 while gradually releasing the strain energy stored therein. Concurrently the support shaft 6 also starts to rotate in the same direction. This rotation of the support shaft 6 in the clamping direction A allows the clamp piece 7 to turn in the clamping direction A over a same angel of rotation due to operation by the back-up spring 9.

During this process, the stopper 8 on the support shaft 6 is kept in contact with the clamp piece 7 to control rotation of the clamp piece 7 whilst turning in synchronism with rotation of the support shaft 6. The clamp piece 7 ceases its turning in the clamping direction A as it comes into engagement with the anchor block 13 on the clamp frame 12. The hook piece 2 further continues its turning due to release of the strain energy stored in the clamp spring 5. This turning of the hook piece 2 is accompanied with concurrent rotation of the support shaft 6 fixed thereto. By this continued rotation of the support shaft 6, the stopper 8 gets out of contact with the clamp piece 7 which is then moved upwards due to the above-described eccentric relationship. As a result of this upward movement, the clamp piece 7 is brought into a firm engagement with the anchor block 13 on the clamp frame 12. Thus, the pallet 1 is fixed to the clamp frame 12 by a strong clamp force.

In order to disengage the pallet 1 from the clamp frame 12, the pallet 1 is again hoisted by the hoist mechanism. Then the entire elements act in a quite opposite fashion to disengage the clamp piece 7 from the anchor block 13 on the clamp frame 12, thereby liberating the pallet 1.

For balanced hoisting of the pallet 1, at least a pair of hooks 2 should preferably provided on the pallet 1 in practice.

In the above-described process, the weight of the pallet and the workpiece carried thereby, i.e. their potential energy is converted into the strain energy of the clamp spring and the strain energy so stored in the clamp spring is released at the very moment of clamping. As a consequence, clamping and unclamping can be carried out only by hoisting and lowering the pallet above the clamp frame of the machine without use of any pneumatic or hydraulic pressure and use of any interfaces.

Figure 9A:
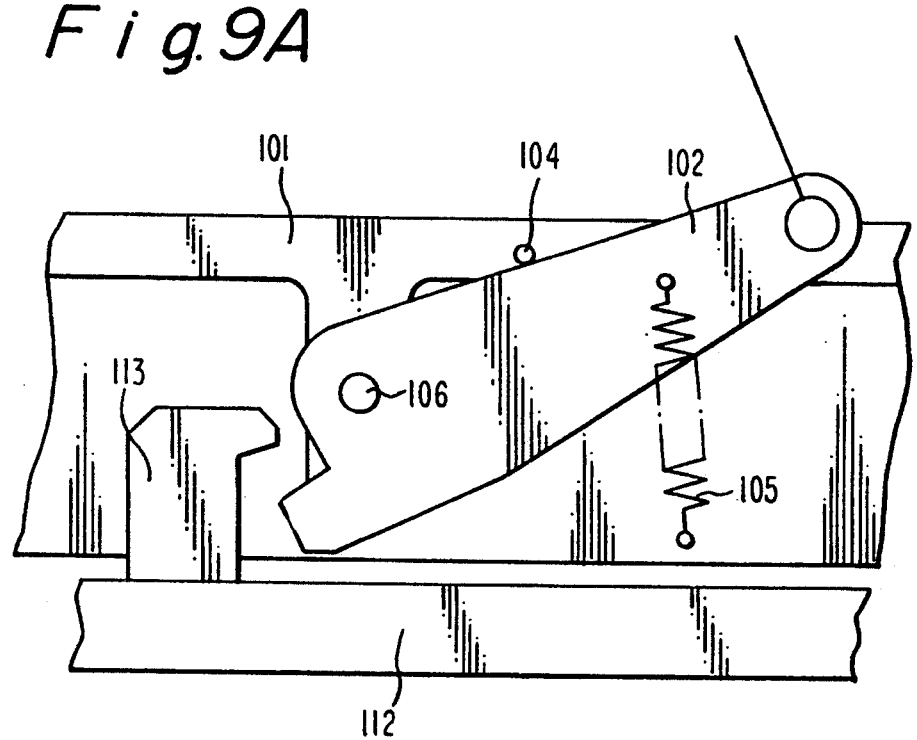
FIGS. 9A and 9B are side views of another embodiment of the auto-clamper in accordance with the present invention in the unclamped and clamped positions, respectively.
Figure 9B:
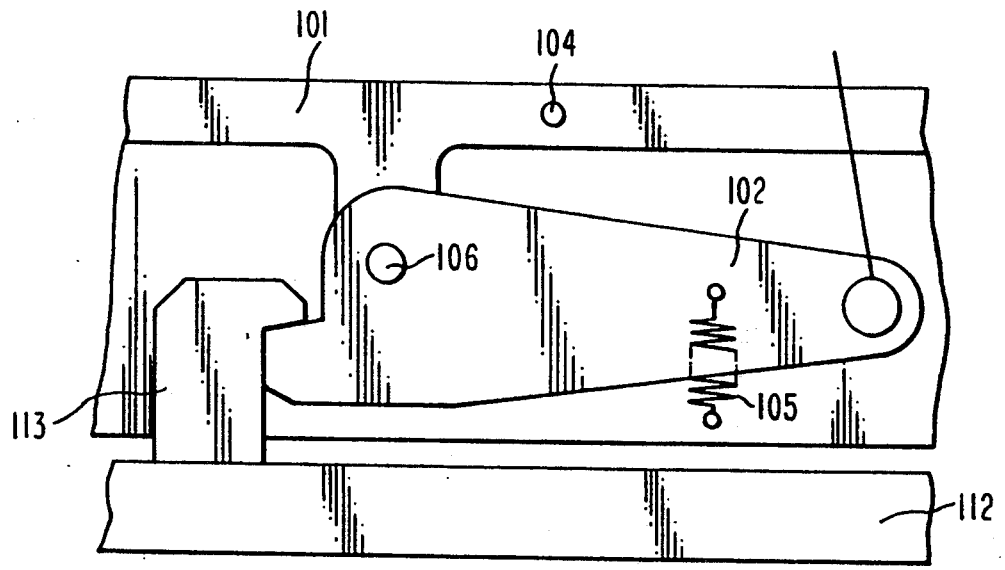

Another embodiment of the auto-clamper in accordance with the present invention is shown in FIGS. 9A and 9B. In this embodiment and all other embodiments of the present invention, shown in FIGS. 10A-17C, various structural features have similar components and operate in similar manners. Thus, the similar components will be preceded by reference numbers in the 100 series, 200 series, etc. For example, hook piece 2 of the embodiment shown in FIGS. 1-8 will be designated 102 in FIGS. 9A and 9B, 202 in FIGS. 10A and 10B, 302 in FIGS. 11A and 11B, 402 in FIGS. 12A and 12B, 502 in FIGS. 13A and 13B, 602 in FIGS. 14A and 14B, and 702 in FIGS. 15-17C. The clamper head in FIGS. 9A and 9B is given in the form of a clamp nose 117 formed at the free end of the hook piece 102. Like the foregoing embodiment, the hook piece 102 is secured to the support shaft 106 rotatably mounted to the pallet 101 and the clamp spring 105. A tension spring in this example, is interposed between the hook piece 102 and the pallet 101. Another type of spring may be used for the clamp spring 105. The stopper 104 is secured to the pallet 101 at a position to limit upwards turning of the hook piece 102 in the unclamping direction B.

In the position shown in FIG. 9A, the pallet 101 is hoisted and the hook piece 102 turns upwards out of engagement of the anchor block 113 on the clamp frame 112. The clamp spring 105 is stretched in this position to store the strain energy. As the pallet 101 is lowered and brought into contact with the clamp frame 112, the hook piece 102 starts to turn downwards and the clamp spring 105 gradually releases the strain energy stored therein during hoisting. By continued turning of the hook piece 102, its clamp nose 117 comes into engagement with the anchor block 113 on the clamp frame 112 as shown in FIG. 9B to terminate the clamping pall.

The other embodiment of the auto-clamper in accordance with the present invention is shown in FIGS. 10A and 10B, in which the hook piece 202 is connected to the clamper head via a single link mechanism. More specifically, the hook piece 202 is provided, near the support shaft 206, with an upper projection 202a and a lower projection 202b. The clamp spring 205 is interposed between the upper projection 202a of the support shaft 202 and the pallet 201 whereas the lower projection 202b is pivoted to one end of a link 218. The other end of the link 218 is pivoted to the proximal end of a clamp slide 227 which is guided for sliding in a horizontal direction by a leg 1a of the pallet 201 so as to move towards and away from the anchor block 213 on the clamp frame 212.

In the position shown in FIG. 10A, the pallet 201 is hoisted and the hook piece 205 turns in the unclamping direction B against the force by the clamp spring 5 with the clamp slide 227 being out of engagement with the anchor block 213. As the pallet 201 is lowered, the hook piece 202 starts to turn in the clamping direction A and the clamp spring 205 gradually releases the strain energy stored therein during hoisting. On-contact of the pallet 201 with the clamp frame 212, continued turning of the hook piece 202 pushes the clamp slide 227 towards the anchor block 213 via the link 218 and, in the position shown in FIG. 10B, the clamp slide 227 is brought into engagement with the anchor block 213.

Figure 11A:
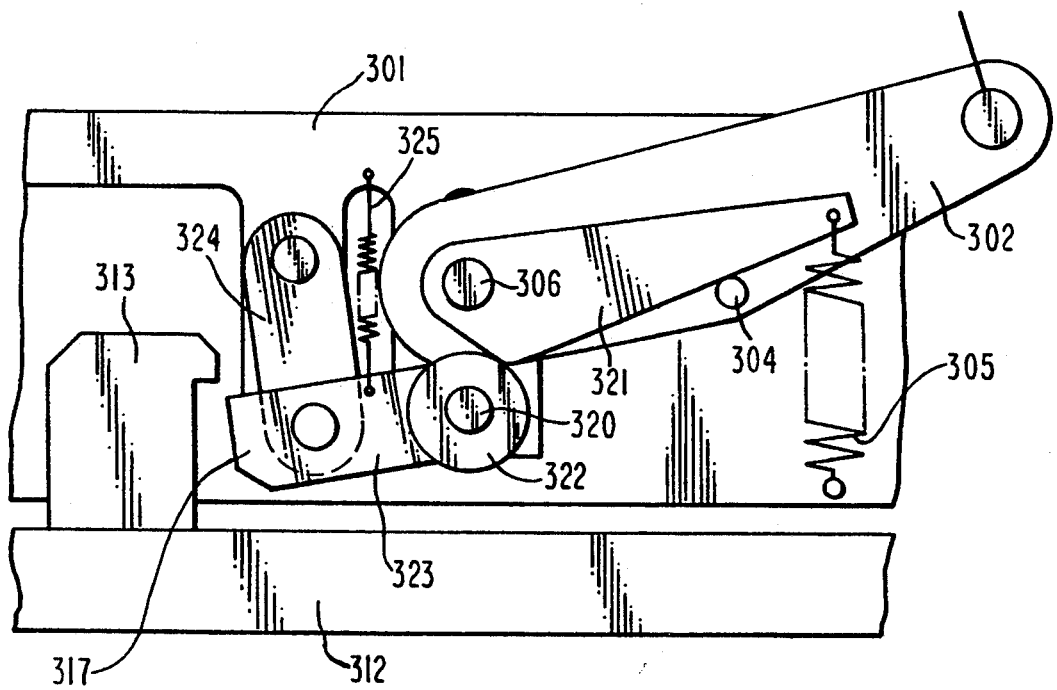
FIGS. 11A and 11B are side views of the other embodiment of the auto-clamper in accordance with the present invention in the unclamped and clamped positions, respectively.
Figure 11B:
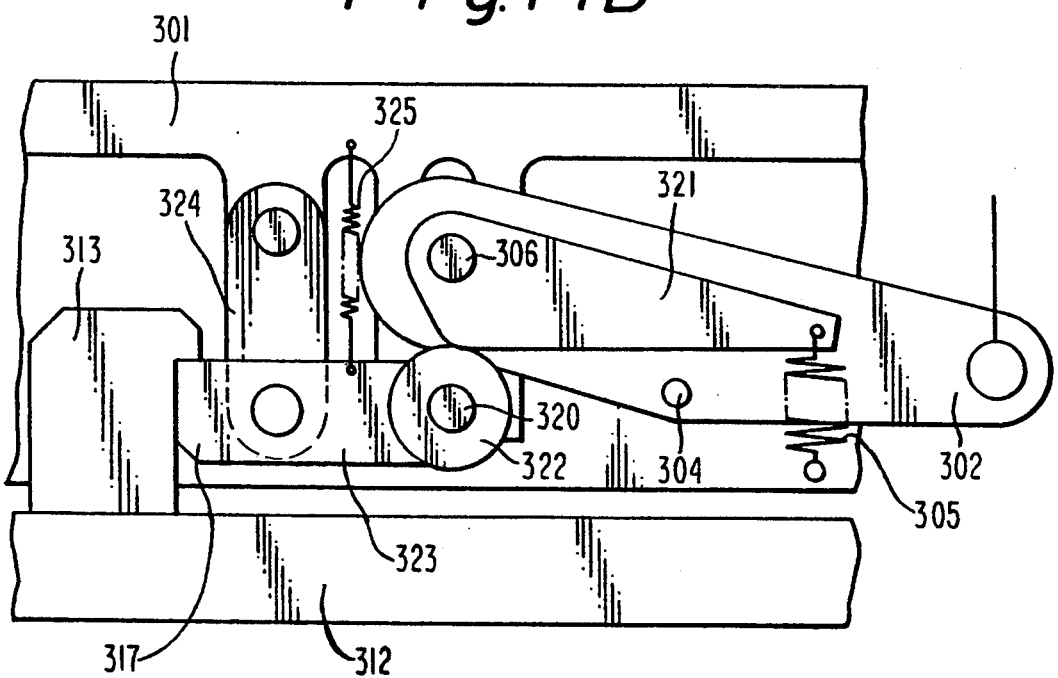

The other embodiment of the auto-clamper in accordance with the present invention is shown in FIGS. 11A and 11B, in which the hook piece 302 is connected to the clamper head via a cam mechanism. More specifically, a cam plate 321 is rotatably mounted at one end to the support shaft 306 in parallel to the hook piece 302 whilst extending in a direction same as the hook piece 302. The other end of the plate cam 321 is connected to the clamp spring 305. The stopper 304 in this case is fixed to the body of the hook piece 302. A horizontal shaft 320 is received in a vertical slot (not shown in the illustration) in a vertically slidable arrangement and a cam roller 322 is rotatably mounted to the shaft 320. By operation of the clamp spring 305 the cam roller 22 is always kept in pressure contact with the lower face of the plate cam 321. A substantially horizontal link 323 is fixed at one end to the cam roller 322 and the clamper head in this case is given in the form of a clamp nose 317 formed at the other end of the link 323. An arm 24 is pivoted at its upper end to the pallet 301 and, at the lower end, to the body of the link 323. A back-up spring spring 325 is interposed between the link 323 and the pallet 301.

In the position shown FIG. 11A, the pallet 301 is hoisted and turning of the hook piece 302, i.e. the plate cam 321 in the unclamping direction to cause lifting of the cam roller 322. The clamp nose 317 of the link 323 is brought out of engagement with the anchor block 313 on the clamp frame 312, and the clamp spring 305 is stretched to store the strain energy therein. In the position shown in FIG. 11B, the pallet 301 is already in contact with the clamp frame 312 and the cam roller 322 is pushed down by the corresponding turning of the plate cam 21 in the clamping direction. By release of the strain energy by the clamp spring 305 the clamp nose 317 is brought into firm engagement with the anchor block 313 on the clamp frame.

Figure 12B:
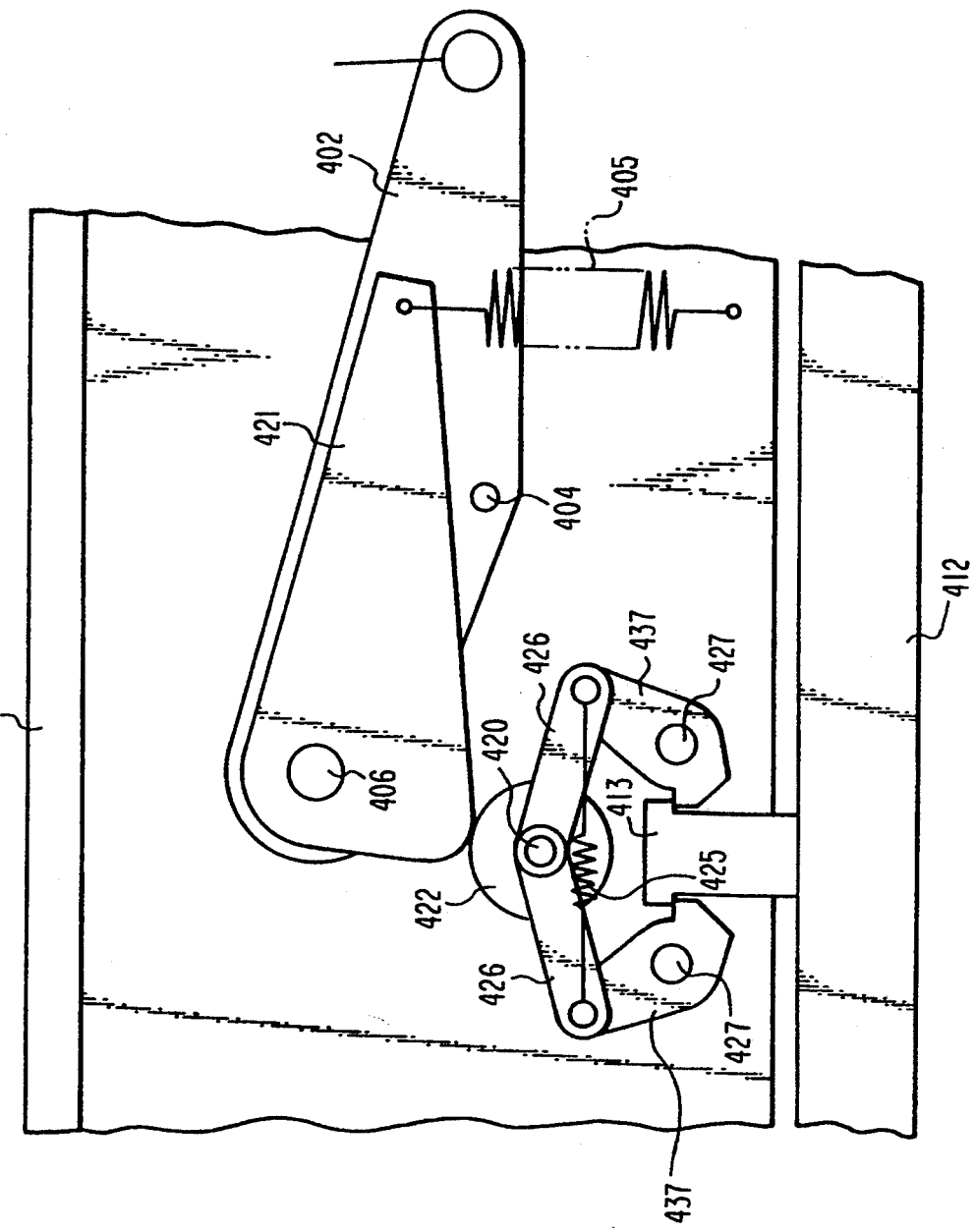

A variant of the auto-camper of FIGS. 11A and 11B is shown in FIGS. 12A and 12B, in which the clamper head is given in the form of a pair of clamp pawls 437. More specifically, a pair of links 426 are inserted at the upper ends over the center shaft 420 of the cam roller 422 and the lower end of each link 426 is pivoted to the upper end of the pawl 437 which is mounted to a horizontal pivot 427 on the pallet 401. The back-up spring 425 in this example is interposed between the pair of clamp pawls 437.

In the position shown in FIG. 12A the clamp pawls 437 are placed out of engagement with the anchor block 413 on the clamp frame 412 whereas, in the position shown in FIG. 12B, the clamp pawls 437 bite the anchor block 413 from the both sides.

Figure 13A:
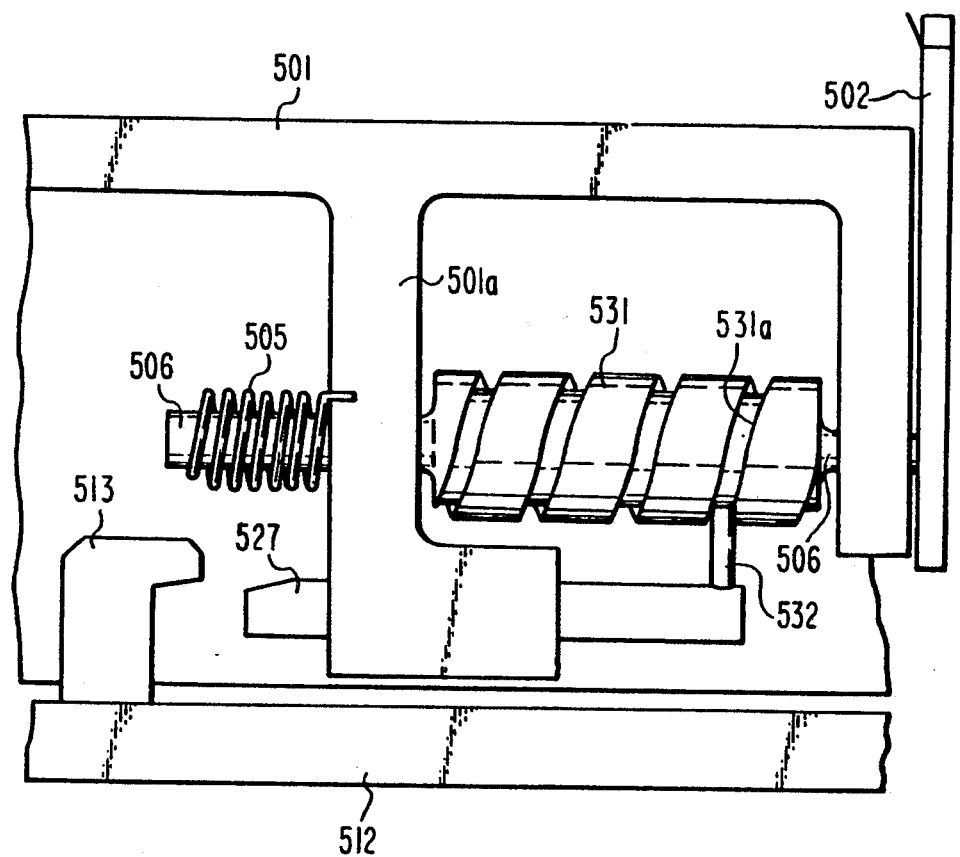
FIGS. 13A and 13B are side views of the other embodiment of the auto-clamper in accordance with the present invention in the unclamped and clamped positions, respectively.
Figure 13B:
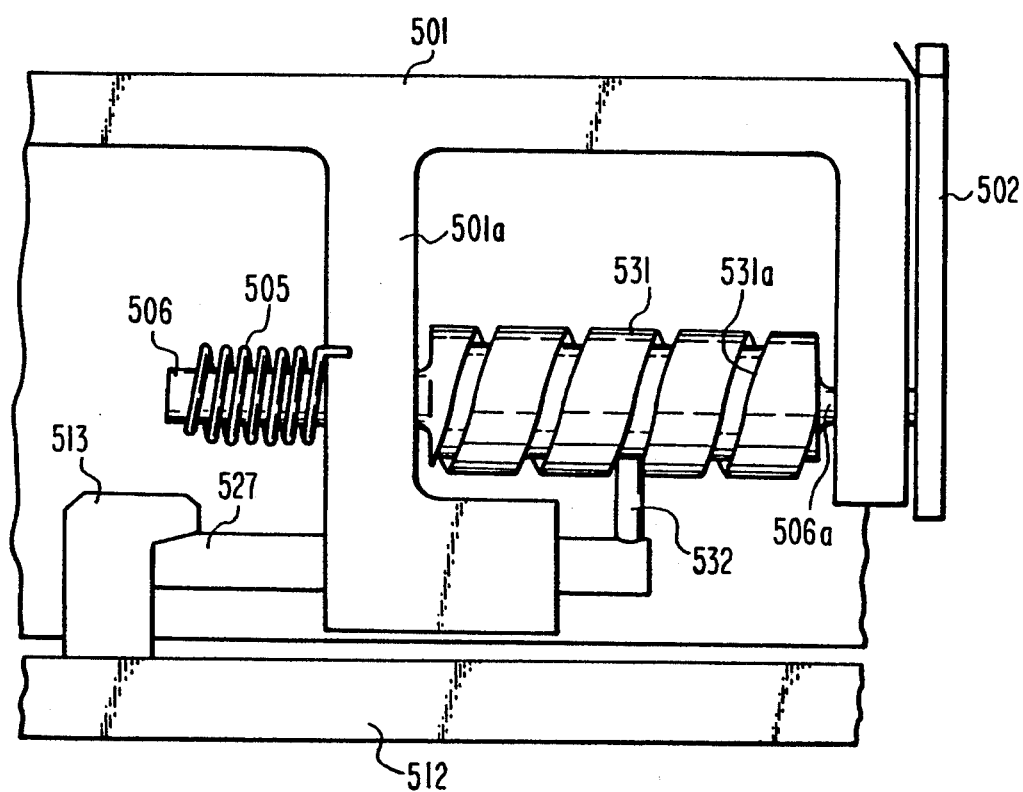

The other embodiment of the auto-clamper in accordance with the present invention is shown in FIGS. 13A and 13B, in which a cylindrical cam is used for connecting the hook piece 502 to the clamper head. The cylindrical cam 531 is concentrically secured to the support shaft 506 of the hook piece 502 and provided with a spiral groove 531a. The clamp spring 505 in this example is given in the form of a coil spring. One end of the coil spring is fixed to the pallet 501 and the other end of the coil spring is fixed to the support shaft in a manner to constantly surge the hook piece 502 to move in the clamping direction. Like the embodiment shown in FIG. 10A, the clamp slide 527 is horizontally guided by the leg 1a 501a of the pallet 501 for movement towards and away from the anchor block 513 on the clamp frame 512. This clamp slide 527 is provided with a projection 32 532 extending upwards into engagement with the spiral groove 531a in the cylindrical cam 531. Rotation of the cylindrical cam 531 due to turning of the hook piece 502 caused engagement of the clamp slide 527 with the anchor block 513 as shown in FIG. 13B.

Figure 14A:
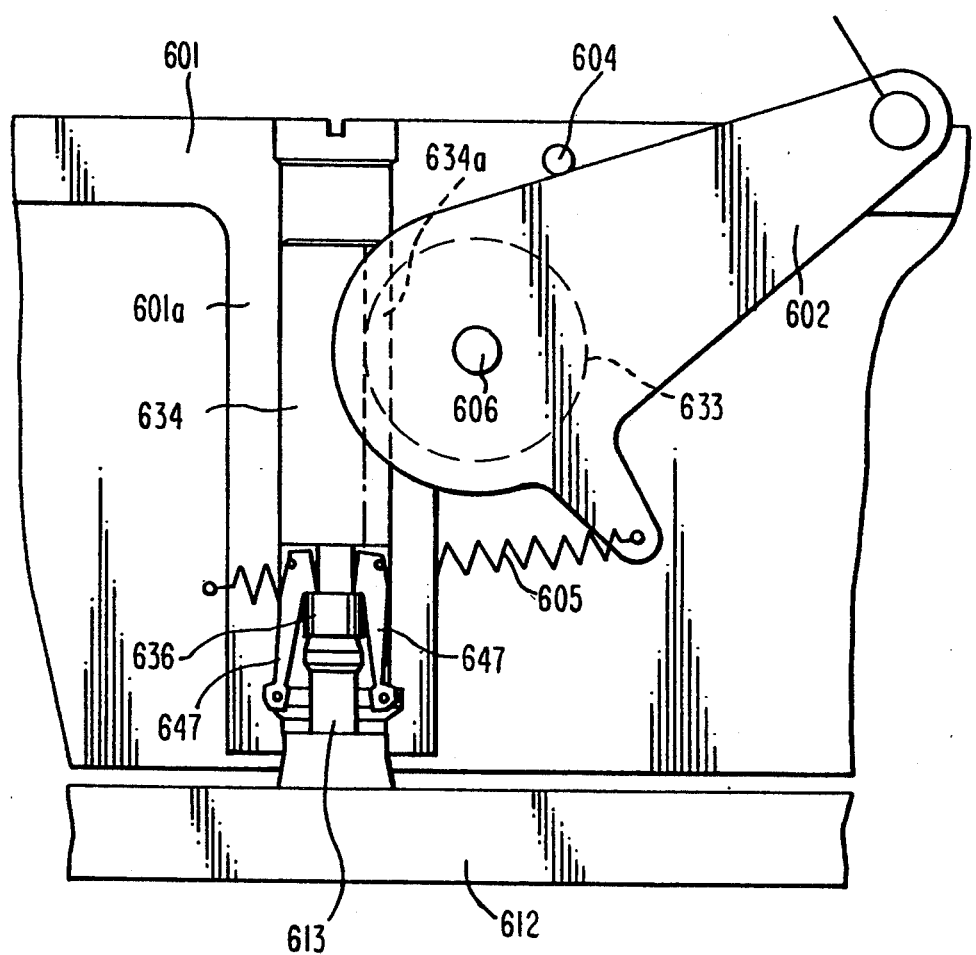
FIGS. 14A and 14B are side view of the other embodiment of the auto-clamper in accordance with the present invention in the unclamped and clamped positions, respectively.
Figure 14B:
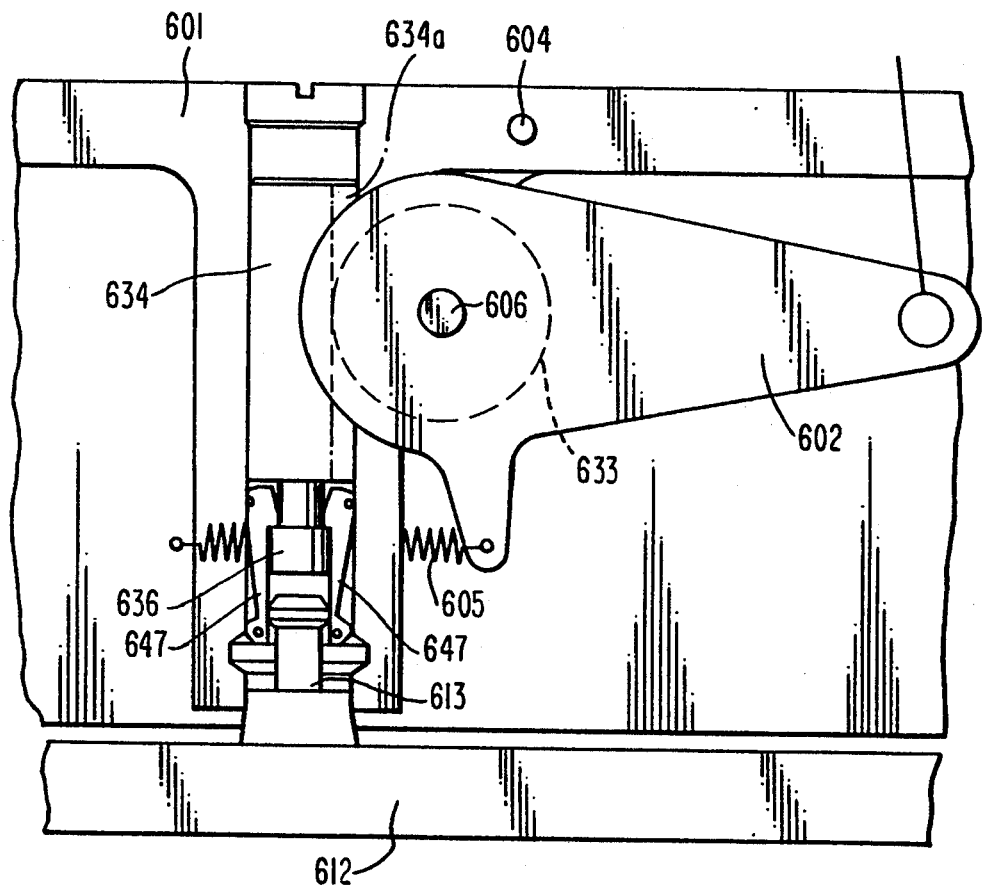

In the case of an embodiment shown in FIGS. 14A and 14B, the hook piece 602 is connected to the clamper head via a pinion-rack mechanism. More specifically, a pinion 633 is fixed to the support shaft 606 for the hook piece 602. A rack cylinder 634 is mounted in the leg 601a of the pallet 601 in a vertically slidable arrangement and provided with a rack 634a kept in meshing engagement with the pinion 633 on the support shaft 606. This rack cylinder 634 is provided at its lower end with an opener 636. In an arrangement to sandwich the opener 636 a pair of clamp fingers 647 are pivoted to the pallet 601 at positions on both sides of the anchor block 613 on the clamp frame 612.

As the hook piece 602 turns in the unclamping direction B in FIG. 14A, the opener 636 is lowered to swing the clamp fingers 647 laterally outwards out of engagement with the anchor block 613 due to the pinion-rack engagement. As the hook piece 602 turns in the clamping direction A as shown in FIG. 14B, the opener 636 is moved upwards to cause inward swing of the clamp fingers 647 which thereupon firmly catch the anchor block 613.

Figure 15:
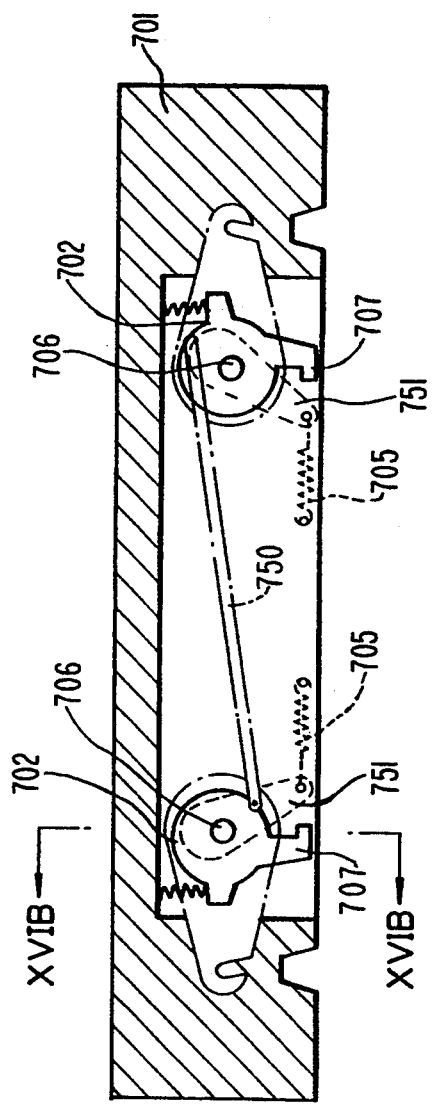
FIG. 15 is a sectional side view of the other embodiment of the auto-clamper in accordance with the present invention.

As stated already, the auto-clamper in accordance with the present invention is in practice provided with two or more clamp units each including the hook piece 602 and its associated elements such as the clamper head. In the case of the foregoing embodiments, the plurality of clamp units are designed to operate quite independently from each other. This independent mode of operation, however, has an innegligible drawback in practice. When the pallet loses its balance during hoisting, the pallet contacts the clamp frame 612 in a more or less inclined state and the clamp head near the spot of the first contact engages with its associated anchor block 613 prior to engagement of other clamper heads with their associated anchor blocks. Such an advanced engagement at one clamper head often hinders subsequent engagement at other clamper heads. In order to well avoid such a trouble operation of the individual clamp unit should preferably be synchronized with each other. One embodiment of the auto-clamper in accordance with the present invention shown in FIGS. 15, 16A and 16B is proposed from this point of view.

As in the foregoing embodiments, each clamp unit includes the hook piece 702 secured to the rotatable support shaft 706 on the pallet 704. The hook pieces 702 of different clamp units are linked with each other by a connecting rod 750 as shown in FIG. 15.

Figure 16A:
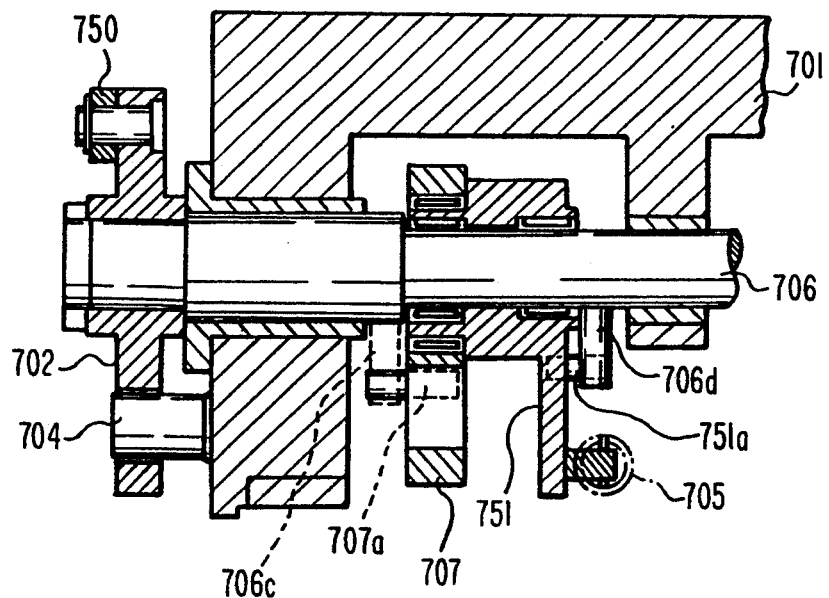
FIG. 16A is a sectional view of the auto-clamper shown in FIG. 15.
Figure 16B:
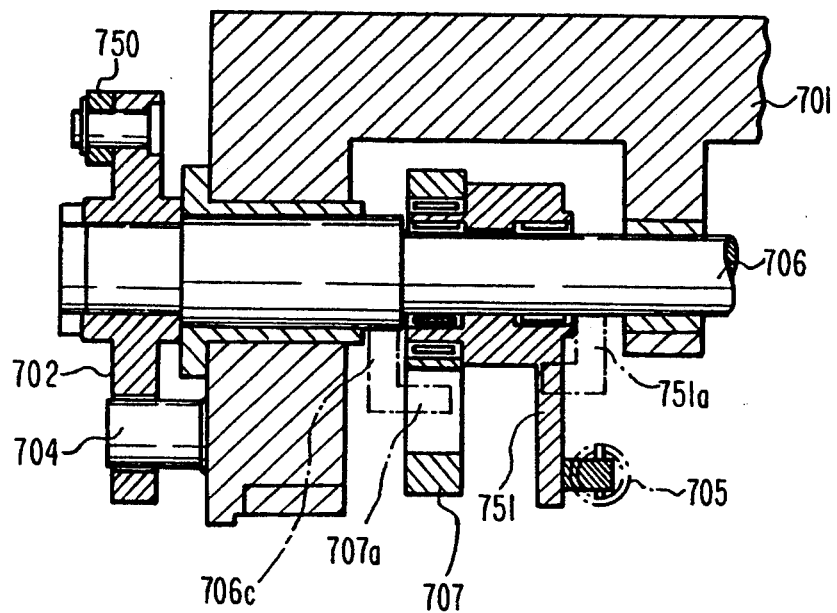
FIG. 16B is a section taken along a line XVIB—XVIB in FIG. 15.

As best seen in FIG. 16A a sleeve 751 is rotatably mounted to the support shaft 706 in parallel to the hook piece 702 and the clamp piece 707 is rotatable inserted over an eccentric section of the sleeve 751. The clamp piece 707 is provided with a pin 707a and a stopper pin 706c projects radially from the support shaft 706 to limit turning of the clamp piece 707. The sleeve 751 is provided with a pin 751a and a stopper pin 706d projects radially from the support shaft 6 706 to limit turning of the clamp piece 707. The clamp piece 707 is always urged to move in the clamping direction by the clamp spring 705 interposed between itself and the pallet 701.

Figure 17A:
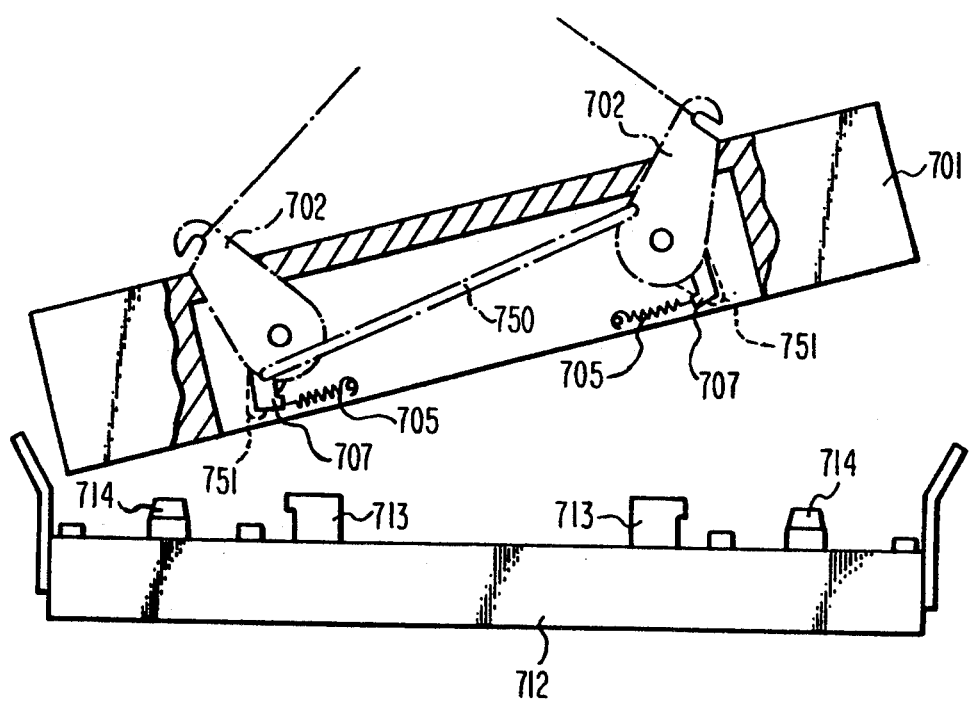
FIGS. 17A to 17C are side views, partly in section, for showing the operation of the auto-clamper shown in FIG. 15.
Figure 17B:
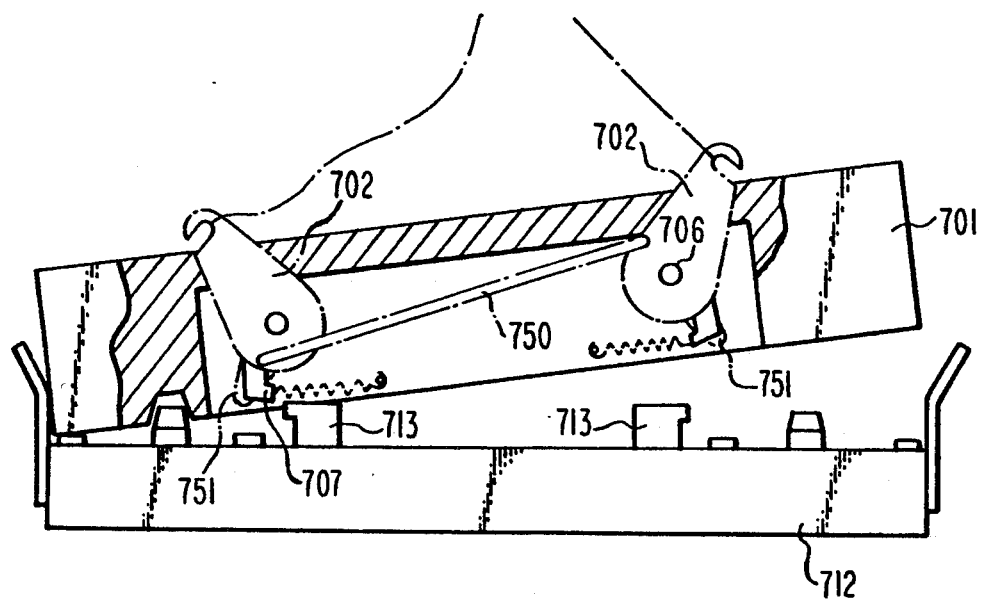
Figure 17C:
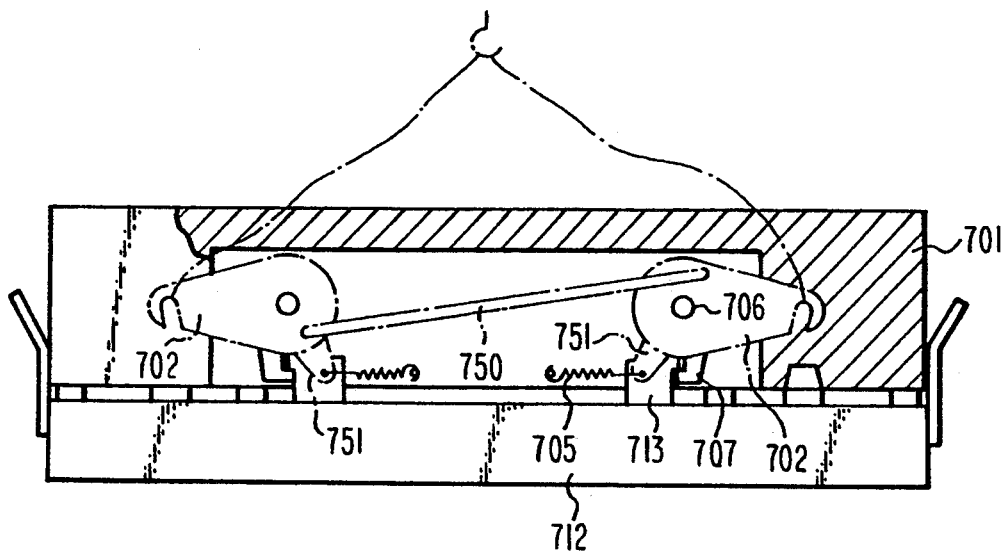

The auto-clamper operates as shown in FIGS. 17A to 17C.

Under the condition shown in FIG. 17A the pallet 701 is somewhat inclined and the left side end of the pallet 701 in the illustration is closer to the clamp frame 712 than the right side end. In this position, the pin 707a on the clamp piece 707 abuts the stopper pin 706c on the support shaft 706 and the pin 751 on the sleeve 751a abuts the stopper pin 706d on the support shaft 706. The moment acting on the support shaft 706 via the associated hook piece 702 and generated by the weights of the pallet 701 and the workpiece on it exceeds the moment acting on the support shaft 706 via the sleeve 751 and generated by the clamp spring 705.

Under the condition shown in FIG. 17B the left side end of the pallet 701 is already in contact with the clamp frame 712 and the clamp piece 707 of the left side clamp unit approaches the anchor block 713 on the clamp frame 712. In this position the hoist cord connected to the left side hook piece 702 is already in slack but the hoist cord connected to the right side hook piece 702 is still in tension. Despite the slack in the hoist cord, the left side hook piece 702 does not change its position shown in FIG. 17A since this hook piece 702 is mechanically connected to the right side hook piece 702 via the connecting rod 750 and the hoist cord connected to the right side hook piece 702 is still in tension. In other word, no hook pieces 702 start the clamping operation until hoist cords of all hook pieces 702 are in slack.

Under the condition shown in FIG. 17C all cords are now in slack and all hook pieces 702 are now in position to start the clamping operation.

I claim:

1. An automated clamping system comprising:
   a pallet adapted to be raised and lowered by a lifting device;
   a frame adapted to support said pallet, said frame having anchor means mounted thereon for securing said pallet upon placement of said pallet on said frame; and
   automatic clamping means mounted on said pallet and normally actuated to an engaged position whereby said pallet is automatically secured to said anchor means upon lowering of said pallet onto said frame, said automatic clamping means being further disposed for automatic actuation to a disengaged position with respect to said anchor means upon application of a lifting force sufficient to lift said pallet off of said frame.

2. The automated clamping system of claim 1, wherein said anchor means comprises at least one anchor block fixed to said frame.

3. The automated clamping system of claim 2, wherein said at least one anchor block comprises a pair of anchor blocks, each of said anchor blocks being disposed for engagement and disengagement with said automatic clamping means.

4. The automated clamping system of claim 3, wherein said anchor means further comprises at least one positioning pin mounted on said frame between said pair of anchor blocks for assisting in the relative positioning of said pallet and said frame.

5. The automated clamping system of claim 1, wherein said automatic clamping means comprises at least one automatic clamping device mounted on said pallet, said at least one automatic clamping device including at least one engagement member thereon and spring means for providing a spring force to urge said at least one engagement member into said engaged position, said at least one engagement member being automatically actuatable to said disengaged position upon application of said lifting force thereto, said lifting force being greater than said spring force on said spring means and being automatically applied upon said lifting of said pallet off of said frame.

6. The automated clamping system of claim 5, further comprising at least one horizontal support shaft rotatably mounted on said pallet, said at least one automatic clamping device comprising a plurality of automatic clamping devices, each of said plurality of automatic clamping devices including a hook piece rotatably mounted on said at least one horizontal support shaft so that each of said hook pieces is turnable in a vertical direction when connected to said lifting device for hoisting said pallet, said at least one engagement member comprising a plurality of clamp pieces, each of said plurality of clamp pieces being integrally connected to a corresponding one of said plurality of hook pieces in a manner such that said plurality of clamp pieces are actuated from said engaged position to said disengaged position with respect to said anchor means upon lifting said pallet by said lifting device.

7. The automated clamping system of claim 5, further comprising at least one horizontal support shaft rotatably mounted on said pallet, said at least one automatic clamping device comprising a plurality of automatic clamping devices, each of said plurality of automatic clamping devices including a hook piece rotatably mounted on said at least one horizontal support shaft so that each of said hook pieces is turnable in a vertical direction when connected to said lifting device for hoisting said pallet, said at least one engagement member comprising a plurality of clamp pieces, each of said plurality of clamp pieces including a generally elongate member operatively interconnected to a corresponding one of said plurality of hook pieces whereby said generally elongate members are actuated to slide in a generally horizontal direction during movement between said engaged position and said disengaged position so as to become disengaged with respect to said anchor means upon lifting said pallet by said lifting device.

8. The automated clamping system of claim 5, further comprising at least one horizontal support shaft rotatably mounted on said pallet, said at least one automatic clamping device comprising a plurality of automatic clamping devices, each of said plurality of automatic clamping devices including a hook piece rotatably mounted on said at least one horizontal shaft so that each of said hook pieces is turnable in a vertical direction when connected to a lifting device for hoisting said pallet, said at least one engagement member comprising a plurality of clamp pawls, each of said clamp pawls being operatively interconnected to a corresponding one of said hook pieces whereby said clamp pawls are actuated from said engaged position to said disengaged position so as to become disengaged from said anchor means upon lifting said pallet by said lifting device.

9. The automated clamping system of claim 5, further comprising at least one horizontal support shaft rotatably mounted on said pallet, said at least one automatic clamping device comprising a plurality of automatic clamping devices, each of said plurality of automatic clamping devices including a hook piece rotatably mounted on said at least one horizontal support shaft so that it is turnable in a vertical direction when connected to a lifting device for hoisting said pallet; and synchronization means for synchronizing movement of said plurality of automatic clamping devices, said synchronization means being connected to at least a pair of said automatic clamping devices.

10. The automated clamping system of claim 9, wherein said synchronization means comprises an elongate rod connected to a pair of said plurality of hook pieces.

11. The automated clamping system of claim 5, further comprising at least one horizontal shaft rotatably mounted on said pallet, said at least one automatic clamping device comprising a plurality of automatic clamping devices, each of said plurality of automatic clamping devices including a hook piece rotatably mounted on said at least one horizontal support shaft so that each of said hook pieces is turnable in a vertical direction when connected to said lifting device for hoisting said pallet; and at least one cam mechanism interconnected to at least one corresponding one of said plurality of hook pieces and said at least one engagement member, said at least one cam mechanism being responsive to movements of said corresponding ones of said plurality of hook pieces and being adapted to translate said movements to said corresponding ones of said engagement members, said spring means being connected between said hook pieces and said corresponding at least one cam mechanism so that said plurality of hook pieces are turnable in a vertical direction when said pallet is lifted by said lifting device, thereby actuating said engagement members from said engaged position to said disengaged position.

12. The automated clamping system of claim 5, further comprising at least one horizontal support shaft rotatably mounted on said pallet, said at least one automatic clamping device comprising a plurality of automatic clamping devices, each of said plurality of automatic clamping devices including a hook piece rotatably mounted on said at least one horizontal support shaft so that it is turnable in a vertical direction when connected to said lifting device for hoisting said pallet; and at least one pinion-rack mechanism interconnected to corresponding ones of said hook pieces and said engagement members, said at least one pinion-rack mechanism being responsive to movements of said hook pieces and being adapted to translate said movements to said corresponding ones of said engagement members, said spring means being connected between said hook pieces and said corresponding pinion-rack mechanisms so that said hook pieces are turnable in a vertical direction when said pallet is lifted by said lifting device, thereby actuating said engagement members from said engaged position to said disengaged position.

* * * * *

UNITED STATES PATENT AND TRADEMARK OFFICE
CERTIFICATE OF CORRECTION

PATENT NO. : 5,346,270

DATED : September 13, 1994

INVENTOR(S) : Kuse

It is certified that error appears in the above-identified patent and that said Letters Patent is hereby corrected as shown below:

```
                           Item [60],
On the title page, in the "Related U.S. Application Data" section
  "Apr. 13, 1989" should read --Oct. 13, 1989--.
Column 1, line 8, "Apr. 13, 1989" should read --Oct. 13, 1989--.
Column 2, line 12, "view" should read --views--.
Column 2, line 20, "view" should read --views--.
Column 3, line 30, "angel" should read --angle--.
Column 3, line 57, after "should preferably" insert --be--.
Column 4, line 52, "205" should read --202--.
Column 4, line 53, "5" should read --205--.
Column 4, line 58, "On-contact" should read --On contact--.
Column 5, line 9, "22" should read --322--.
Column 5, line 14, "24" should read --324--.
Column 5, line 29, "21" should read --321--.
Column 5, line 33, "auto-camper" should read --auto-clamper--.
Column 6, line 39, after "such a trouble" insert --,--.
Column 6, line 57, "6 706" should read --706--.
Column 6, line 68, "751" should read --751a--.
Column 6, line 68, "751a" should read --751--.
```

Signed and Sealed this

Thirteenth Day of December, 1994

*Attest:*

BRUCE LEHMAN

*Attesting Officer*       *Commissioner of Patents and Trademarks*